United States Patent
Lee

(10) Patent No.: US 7,864,810 B2
(45) Date of Patent: Jan. 4, 2011

(54) DISPLAY APPARATUS AND CONTROL METHOD THEREOF

(75) Inventor: Kwang-ho Lee, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 317 days.

(21) Appl. No.: 11/780,507

(22) Filed: Jul. 20, 2007

(65) Prior Publication Data

US 2008/0170593 A1 Jul. 17, 2008

(30) Foreign Application Priority Data

Jan. 11, 2007 (KR) .................... 10-2007-0003508

(51) Int. Cl.
*H04J 3/06* (2006.01)
(52) U.S. Cl. .................... 370/503; 348/731; 725/134
(58) Field of Classification Search ............ 370/503, 370/389; 348/731; 725/134; 354/764
See application file for complete search history.

(56) References Cited

U.S. PATENT DOCUMENTS 6,313,886 B1 * 11/2001 Sugiyama ............... 348/731
2002/0118679 A1 * 8/2002 Eyer ...................... 370/389
2003/0197732 A1 * 10/2003 Gupta .................... 345/764
2004/0194149 A1 * 9/2004 Kessler ................... 725/134

FOREIGN PATENT DOCUMENTS

| JP | 9-130764 A | 5/1997 |
| KR | 10-0245842 B1 | 12/1999 |
| KR | 10-2006-0034745 A | 4/2006 |
| KR | 10-2001-0081402 A | 8/2007 |

* cited by examiner

*Primary Examiner*—Albert T Chou
(74) *Attorney, Agent, or Firm*—Sughrue Mion, PLLC

(57) ABSTRACT

A display apparatus includes a demultiplexing unit which extracts program clock reference (PCR) information for synchronizing image information and voice information of a received image signal; a syntax analyzing unit which identifies a first and a second packet identification number of a packet having the PCR information so that the demultiplexing unit can extract the PCR information; and a controlling unit which, if the first packet identification number and the second packet identification number are different therebetween, controls the syntax analyzing unit to set one of the first packet identification number and the second packet identification number that corresponds to the packet having the PCR information, in the demultiplexing unit.

10 Claims, 2 Drawing Sheets

DISPLAY APPARATUS AND CONTROL METHOD THEREOF

CROSS-REFERENCE TO RELATED APPLICATIONS

This application claims priority from Korean Patent Application No. 10-2007-0003508, filed on Jan. 11, 2007 in the Korean Intellectual Property Office, the disclosure of which is incorporated herein by reference.

BACKGROUND OF INVENTION

1. Field of Invention

Apparatuses and methods consistent with the present invention relate to a display apparatus and a control method thereof, and more particularly to a display apparatus which synchronizes tuning between image information and voice information, and a control method thereof.

2. Description of the Related Art

In general, a display apparatus such as a monitor and television (TV) processes and outputs image information and voice information which are included in an image signal provided by an external apparatus such as a computer, a digital video disk (DVD) and other known image devices in the art or by a broadcasting station.

In this case, the display apparatus processes and outputs the image information and the voice information respectively, where processing times of the image information and the voice information are different therebetween. Therefore, synchronization between the image information and the voice information is important.

The sequence for processing the image signal to tune the synchronization between the image information and the voice information is as follows.

When the image signal is received, the image information and the voice information are demultiplexed, and packetized elementary stream (PES) and program specific information (PSI) of the image information and the voice information are output.

Then, the PSI information is decoded by a program map table (PMT) and a virtual channel table (VCT), and hence the synchronization is tuned using program clock reference (PCR) information which corresponds to PCR packet identification (PID) included in the PMT and the VCT. In this case, the PCR information is a reference value for setting a system time clock (STC) value when the image information and the voice information are decoded.

However, if the received image signal complies with Advanced Television System Committee (ATSC) specification, the image signal includes both of the PSI information, and program and system information protocol (PSIP) information.

Also, the PCR PID for tuning the synchronization between the image information and the voice information is present in the PMT of the PSI information and the VCT of the PSIP. If the PCR PID of the PMT is different from the PCR PID of the VCT due to a mistake from the broadcasting station, of if a wrong PCR PID is transmitted to either one of the PMT and the VCT, the synchronization between the image information and the voice information may not be tuned accurately.

SUMMARY OF THE INVENTION

Exemplary embodiments of the present invention overcome the disadvantages described above and other disadvantages not described above. Also, the present invention is not required to overcome the disadvantages described above, and an exemplary embodiment of the present invention may not overcome any of the problems described above.

The present invention to provides a display apparatus and a control method thereof which determines which PCR PID should be used if a plurality of PCR PIDs included in an image signal is different therebetween.

The present invention also provides a display apparatus and a control method thereof which accurately tunes synchronization between image information and voice information if a plurality of the PCR PIDs included in the image signal is different therebetween.

According to an aspect of the present invention, there is provided a display apparatus comprising: a demultiplexing unit which extracts program clock reference (PCR) information for synchronizing image information and voice information of a received image signal; a syntax analyzing unit which identifies a first and a second packet identification number for a packet having the PCR information so that the demultiplexing unit can extract the PCR information from the image signal; and a controlling unit which, if the first packet identification number and the second packet identification number that are identified by the syntax analyzing unit are different therebetween, controls the syntax analyzing unit to set one of the first packet identification number and the second packet identification number that corresponds to the packet having the PCR information, to the demultiplexing unit.

If a packet corresponding to the first packet identification number and a packet corresponding to the second packet identification number both have the PCR information, the controlling unit controls the syntax analyzing unit to set the first packet identification number or the second packet identification number, which is the same as the packet identification number of the packet having the image information, to the demultiplexing unit.

If a packet corresponding to the first packet identification number and a packet corresponding to the second packet identification number both have the PCR information, the controlling unit controls the syntax analyzing unit to set the first packet identification number or the second packet identification number, which is the same as the packet identification number of the packet having the voice information, to the demultiplexing unit.

The controlling unit determines for a reference time whether a PCR_flag of an adaptation field of the image signal is 1, and if the PCR_flag is not 1, then the controlling unit determines that there is no packet identification number.

If there is no packet identification number, the controlling unit controls the syntax analyzing unit to set one of the packet identification number of the packet having the image signal and the packet identification number of the packet having the voice signal to the demultiplexing unit.

According to another aspect of the present invention can there is provided a control method of a display apparatus, the control method comprising: identifying, when an image signal is input, a first and a second packet identification number of a packet having program clock reference (PCR) information so that the PCR information for synchronizing image information and voice information of the input image signal can be extracted; determining whether the identified first packet identification number and the identified second packet identification number are the same; setting either one of the first packet identification number and the second packet identification number which corresponds to the packet having the PCR information, if the first packet identification number is different from the second packet identification number; and extracting the PCR information from the packet corresponding to the set packet identification number.

The setting the one of the first packet identification number and the second packet identification number comprises, if the packet corresponding to the first packet identification number and the packet corresponding to the second packet identification number have the PCR information, setting the first packet identification number or the second packet identification number which is the same as the packet identification number of the packet having the image information.

The setting the one of the first packet identification number and the second packet identification number comprises, if the packet corresponding to the first packet identification number and the packet corresponding to the second packet identification number have the PCR information, setting the first identification number or the second identification number which is the same as the packet identification number of the packet having the voice information.

The identifying a first and a second packet identification number of a packet having PCR information comprises determining for a reference time whether a PCR_flag of an adaptation field of the image signal is 1, and if the PCR_flag is not 1, then determining that there is no packet identification number.

The identifying a first and a second packet identification number of a packet having PCR information comprises, if there is no packet identification number, setting either one of the packet identification number of the packet having the image signal and the packet identification number of the packet having the voice signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
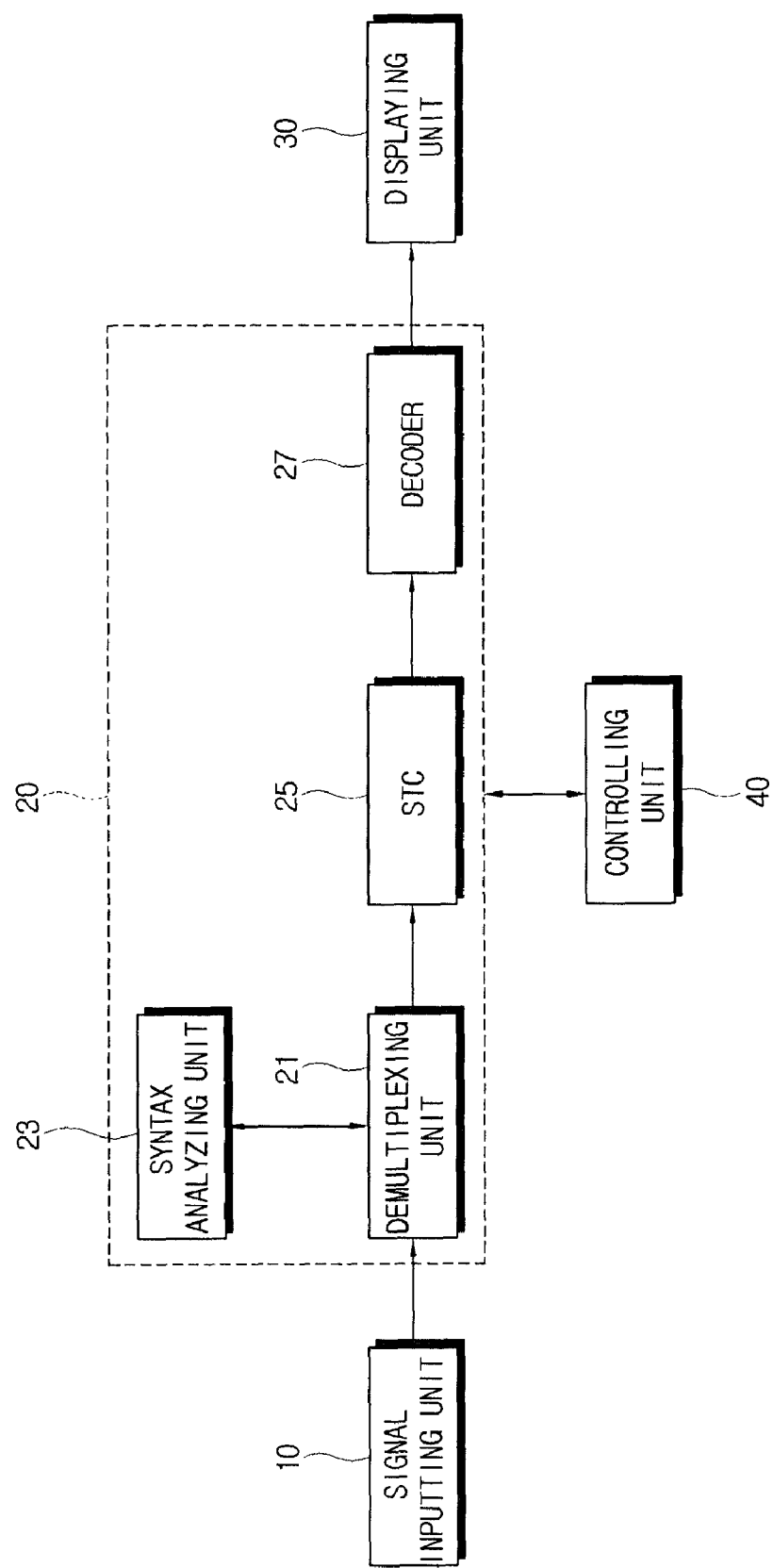
FIG. 1 is a control block diagram of a display apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, the display apparatus according to an exemplary embodiment of the present invention includes a signal inputting unit 10, a signal processing unit 20, a displaying unit 30 and a controlling unit 40.

The signal inputting unit 10 according to this exemplary embodiment has a tuner unit (not shown) which receives an image signal. In this case, the tuner unit (not shown) may be embodied by, for example but not limited to, one or more tuners, a demodulator which demodulates a tuned signal, a multiplexer and other known components in the art.

Also, the signal inputting unit 10 tunes a broadcasting signal having a frequency band which corresponds to a tuning control signal of the controlling unit 40 to be described later. Image information, voice information and other various data in the broadcasting signal of the tuned channel are time-division multiplexed, so that they are received as a form of a packetized transport stream.

For a digital broadcasting signal, as an example, the demodulator outputs a received broadcasting signal in a transport stream form through vestigial sideband (VSB) demodulation process, error correction process and other known signal processes in the art. In this case, the tuner unit (not shown) may include an analog tuner and a digital tuner respectively, or may use a multi-tuner which can receive both of the analog broadcasting signal and the digital broadcasting signal.

The signal processing unit 20 processes the image signal received from the signal inputting unit 10 according to the controlling unit 40 to be described, and provides the processed image signal to the displaying unit 30 to be displayed. The signal processing unit 20 according to this exemplary embodiment, as shown in FIG. 1, includes a demultiplexing unit 21, a syntax analyzing unit 23, a system time clock (STC) 25 and a decoder 27.

The demultiplexing unit 21 extracts section data from the transport stream which has been multiplexed by the tuner unit, and transmits the section data to the syntax analyzing unit 23.

Also, the demultiplexing unit 21 extracts PCR information from the image signal on the basis of a packet address, that is, PID, which has PCR information, set by the syntax analyzing unit 23. Then, the demultiplexing unit 21 transmits the extracted PCR information to the STC 25 periodically.

In addition, the demultiplexing unit 21 separately extracts an image packetized elementary stream/elementary stream (PES/ES) by using the PID having the image information set by the syntax analyzing unit 23 (hereinafter 'VIDEO PID'), and transmits the image PES/ES to the decoder 27. Also, the demultiplexing unit 21 separately extracts a voice PES/ES by using the PID having the voice information (hereinafter 'AUDIO PID'), and transmits the voice PES/ES to the decoder 27.

The syntax analyzing unit 23 analyzes service information (SI) in the section data transmitted by the demultiplexing unit 21, and identifies the PID having the PCR information, that is, PCR PID. Then, the syntax analyzing unit 23 sets the identified PCR PID to the demultiplexing unit 21. Also, the syntax analyzing unit 23 sets the VIDEO PID and the AUDIO PID to the demultiplexing unit 21 so that the demultiplexing unit 21 can separate the image PES/ES and the audio PES/ES.

The STC 25 provides time information, which is required when the decoder 27 generates the image information and the voice information, on the basis of the PCR information provided by the demultiplexing unit 21. That is, if the STC 25 provides the time information to be compared with the time information included in the image information and the voice information which are to be displayed currently, synchronization between the image information and the voice information, that is lip-sync, can be obtained.

The decoder 27 decodes the image PES/ES and the voice PES/ES, which have been extracted and transmitted by the demultiplexing unit 21, on the basis of the time information provided by the STC 25 and hence generates the image information and the voice information. The decoder 27 may include an image decoder decoding the image information and a voice decoder decoding the voice information.

The signal processing unit 20 may additionally have various functions corresponding to a format of the received image signal. For example, the signal processing unit 20 may have an analog-to-digital (A/D) converting function for converting the received image signal of one format into the digital image signal of another format, a scaling function for receiving the digital image signal and/or the analog image signal and adjusting vertical frequency, resolution, picture ratio and other image specifications of the received signal to meet output specification of the displaying unit 30, and a format converting function.

The displaying unit 30 displays the broadcasting signal processed by the signal processing unit 20, and may be embodied by a device of various types, for example but not limited to, a digital light processing (DLP), a liquid crystal display (LCD), a plasma display panel (PDP), and other known display devices in the art.

If a plurality of the PCR PIDs have been identified by the syntax analyzing unit 23, the controlling unit 40 controls the syntax analyzing unit 23 to set one of the plurality of the PCR PID to the demultiplexing unit 21. The controlling unit 40 may be embodied by, for example but not limited to, a controller such as a central processing unit (CPU), a microcomputer and other known controllers in the art.

The controlling unit 40 determines whether the PCR PID identified by the syntax analyzing unit 23 is plural or not. For example, if the broadcasting signal of ATSC specification is received, the PCR PID exists in each of the PMT of the PSI and the VCT of the PSIP. In this case, suppose that the PCR PID included in the PMT of the PSI is a first identification number and that the PCR PID of the VCT of the PSIP is a second identification number.

Then, the controlling unit 40 determines whether the first identification number is the same as the second identification number. If the first identification number is different from the second identification number, the controlling unit 40 determines whether each packet corresponding to the first and the second identification numbers actually includes the PCR information. Then, the controlling unit 40 controls the syntax analyzing unit 23 to set the PCR PID corresponding to the packet, which actually has the PCR information, to the demultiplexing unit 21.

In this case, as the first and the second identification numbers indicate the packet addresses each of which has the PCR information, the controlling unit 40 requests the demultiplexing unit 21 to transmit the packet corresponding to each identification number and hence can determine by identifying the packet whether the PCR information is actually included.

If the PCR information does not actually exist in the packets corresponding to the first and the second identification numbers, the controlling unit 40 compares the first and the second identification numbers with the VIDEO PID. Then, the controlling unit 40 enables the first or the second identification number, which is the same as the VIDEO PID, to be set in the demultiplexing unit 21.

Also, if the packets corresponding to the first and the second identification numbers do not actually have the PCR information, and if neither the first identification number nor the second identification number is the same as the VIDEO PID, the controlling unit 40 enables the identification number which is the same as the AUDIO PID to be set in the demultiplexing unit 21.

If neither the first identification nor the second identification number is the same as the VIDEO PID and the AUDIO PID, the controlling unit 40 enables the first or the second identification number, which is already set, to be set in the demultiplexing unit 21.

If the PCR PID can not be identified for a specified setting time, the controlling unit 40 determines that there is no PCR information and controls the demultiplexing unit 21 to stop the PCR information extracting process. In this case, the controlling unit 40 can determine whether the PCR information exists by determining whether a PCR_flag is set to 1 in an adaptation field of the image signal.

Therefore, if the PCR PID for synchronizing the image information and the voice information of the received image signal is plural, the PCR PID which actually has the PCR information is made to be used, so that problems in a playback of digital television (DTV) broadcasting and the lip-sync can be prevented sufficiently.

If the controlling unit 40 determines that the first identification number is the same as the second identification number, the controlling unit 40 enables either one of the two identification numbers to be set in the demultiplexing unit 21.

Hereinafter, a control method of the display apparatus according to the exemplary embodiment of the present invention described above is described with reference to a flow diagram of FIG. 2.

Figure 2:
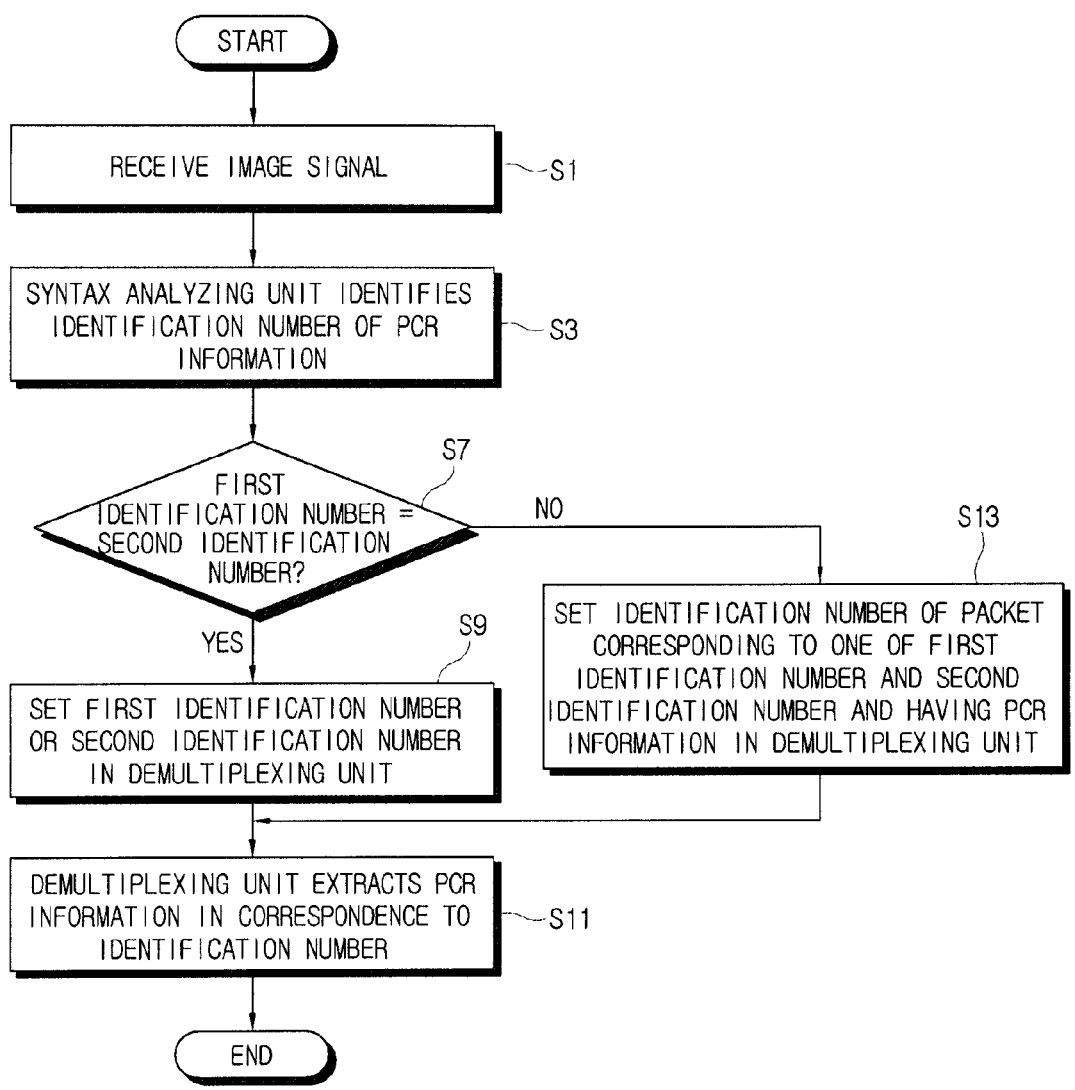
FIG. 2 is a flow diagram describing a control process of the display apparatus according to the exemplary embodiment of the present invention.

As illustrated in FIG. 2, when the image signal is received (S1), the syntax analyzing unit 23 identifies the identification number of the packet having the PCR information which is included in the image signal, that is, the PCR PID (S3).

The controlling unit 40 determines whether plural PCR PIDs have been identified. As described above, if the received image signal is of ATSC specification, the PCR PID exists in both the PMT of the PSI and the VCT of the PSIP.

Then, suppose that the PCR PID included in the PMT of the PSI is the first identification number and that the PCR PID of the VCT of the PSIP is the second identification number, it is determined whether the first identification number is the same as the second identification number (S7).

If it is determined that the first identification number is the same as the second identification number, the syntax analyzing unit 23 is controlled to set either one of the first identification number and the second identification number to the demultiplexing unit 21 (S9).

On the other hand, it is determined that the first identification number is not the same as the second identification number, the syntax analyzing unit 23 is controlled to set the identification number of the packet, which corresponds to either one of the first identification number and the second identification number and which actually has the PCR information, to the demultiplexing unit 21 (S13).

Then, the demultiplexing unit 21 extracts the PCR information on the basis of the identification number set by the syntax analyzing unit 23 (S11).

Therefore, if the PCR PID for synchronizing the image information and the voice information of the received image signal is plural, the PCR PID which actually has the PCR information is made to be used, so that problems in the playback of DTV broadcasting and the lip-sync can be prevented sufficiently.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a demultiplexing unit which extracts program clock reference (PCR) information for synchronizing image information and voice information of a received image signal;
   a syntax analyzing unit which identifies a first packet identification number from a program management table (PMT) and a second packet identification number from a virtual channel table (VCT) of a packet having the PCR information so that the demultiplexing unit can extract the PCR information; and a controlling unit which determines whether the first packet identification number and the second packet identification number are different, and controls the syntax analyzing unit to set one of the first packet identification number and the second packet identification number that corresponds to the packet actually having the PCR information, in the demultiplexing unit when the first packet identification number and the second packet identification number are determined to be different.

2. The display apparatus according to claim 1, wherein if a packet corresponding to the first packet identification number and a packet corresponding to the second packet identification number both have the PCR information, the controlling unit controls the syntax analyzing unit to set the first packet identification number or the second packet identification number, which is the same as the packet identification number of the packet having the image information, in the demultiplexing unit.

3. The display apparatus according to claim 1 wherein if the packet corresponding to the first packet identification number and the packet corresponding to the second packet identification number both have the PCR information, the controlling unit controls the syntax analyzing unit to set the first packet identification number or the second packet identification number, which is the same as the packet identification number of the packet having the voice information, in the demultiplexing unit.

4. The display apparatus according to claim 1, wherein the controlling unit determines for a reference time whether a PCR_flag of an adaptation field of the image signal is 1, and if the PCR_flag is not 1, then the controlling unit determines that there is no packet identification number.

5. The display apparatus according to claim 4, wherein if there is no packet identification number, the controlling unit controls the syntax analyzing unit to set either one of the packet identification number of the packet having the image signal and the packet identification number of the packet having the voice signal in the demultiplexing unit.

6. A control method of a display apparatus, the control method comprising:

identifying, with a syntax analyzing unit, a first packet identification number from a program management table (PMT) and a second packet identification number from a virtual channel table (VCT) of a packet having program clock reference (PCR) information so that the PCR information for synchronizing image information and voice information of a received input image signal can be extracted;

determining whether the identified first packet identification number and the identified second packet identification number are different;

setting the one of the first packet identification number and the second packet identification number which corresponds to the packet actually having the PCR information, if the first packet identification number is different from the second packet identification number; and extracting, with a demultiplexing unit, the PCR information from the packet corresponding to the packet having one of the first identification number and the second packet identification number which is selected.

7. The control method of a display apparatus according to claim 6, wherein the setting the one of the first packet identification number and the second packet identification number comprises, if the packet corresponding to the first packet identification number and the packet corresponding to the second packet identification number have the PCR information, setting the first packet identification number or the second packet identification number which is the same as the packet identification number of the packet having the image information.

8. The control method of a display apparatus according to claim 6, wherein the setting one of the first packet identification number and the second packet identification number comprises, if the packet corresponding to the first packet identification number and the packet corresponding to the second packet identification number have the PCR information, setting the first identification number or the second identification number which is the same as the packet identification number of the packet having the voice information.

9. The control method of a display apparatus according to claim 6, wherein the identifying a first packet identification number and a second packet identification number of a packet having the PCR information comprises determining for a reference time whether a PCR_flag of an adaptation field of the image signal is 1, and if the PCR_flag is not 1, then determining that there is no packet identification number.

10. The control method of a display apparatus according to claim 9, wherein the identifying the first packet identification number and the second packet identification number of the packet having PCR information comprises, if there is no packet identification number, setting one of the packet identification number of the packet having the image signal and the packet identification number of the packet having the voice signal.

* * * * *